US008305474B2

(12) United States Patent
Purcell et al.

(10) Patent No.: US 8,305,474 B2
(45) Date of Patent: *Nov. 6, 2012

(54) ANALOG-TO-DIGITAL CONVERSION IN IMAGE SENSORS

(75) Inventors: Matthew Purcell, Edinburgh (GB); Graeme Storm, Forres (GB); Derek Tolmie, Edinburgh (GB); Mhamed El Hachimi, Edinburgh (GB); Laurent Simony, Grenoble (FR); Min Qu, Shanghai (CN)

(73) Assignees: STMicroelectronics (R&D) Ltd., Marlow, Buckinghamshire (GB); STMicroelectronics SA (Morocco), Bouskoura (MA); STMicroelectronics (Grenoble 2) SAS, Grenoble (FR)

( * ) Notice: Subject to any disclaimer, the term of this patent is extended or adjusted under 35 U.S.C. 154(b) by 433 days.

This patent is subject to a terminal disclaimer.

(21) Appl. No.: 12/622,373

(22) Filed: Nov. 19, 2009

(65) Prior Publication Data
US 2010/0157035 A1 Jun. 24, 2010

Related U.S. Application Data

(63) Continuation-in-part of application No. 12/402,397, filed on Mar. 11, 2009, now Pat. No. 8,134,623.

(30) Foreign Application Priority Data

Mar. 21, 2008 (EP) .................................. 08153179

(51) Int. Cl.
*H04N 3/14* (2006.01)
*H04N 5/335* (2011.01)
(52) U.S. Cl. .................. 348/301; 348/300; 348/294

(58) Field of Classification Search .......... 348/294–324; 341/126–172
See application file for complete search history.

(56) References Cited

U.S. PATENT DOCUMENTS 5,132,801 A * 7/1992 Yamano .......................... 348/245
5,268,764 A * 12/1993 Kihara et al. .................. 348/245
5,467,056 A * 11/1995 Goumaz ........................ 330/149

(Continued)

FOREIGN PATENT DOCUMENTS

EP   1742369 A2   1/2007
(Continued)

OTHER PUBLICATIONS

European Search Report for Application No. EP08153179, dated Jun. 26, 2008.

*Primary Examiner* — Aung S Moe
*Assistant Examiner* — Chia-Wei A Chen
(74) *Attorney, Agent, or Firm* — Gardere Wynne Sewell LLP

(57) ABSTRACT

An image sensor has a per-column ADC arrangement including first and second capacitors allowing a comparator circuit to perform correlated double sampling. The capacitors are continuously connected to, respectively, the analog pixel signal and a ramp signal without use of a hold operation. The comparator circuit comprises a differential input being connected to the junction of the two capacitors and being biased by a reference signal. The reference signal is preferably sampled and held from a reference voltage. The use of a differential input as first stage of the comparator addresses problems arising from ground voltage bounce when a large pixel array images a scene with low contrast. Connectivity of the differential input stage allows the ramp signal to see a constant capacitive load thus reduce image artifacts referred to as smear.

38 Claims, 5 Drawing Sheets

U.S. PATENT DOCUMENTS

| | | | |
|---|---|---|---|
| 5,585,652 A * | 12/1996 | Kamasz et al. | 257/231 |
| 5,659,355 A * | 8/1997 | Barron et al. | 348/245 |
| 6,781,459 B1 * | 8/2004 | Brown | 330/252 |
| 6,919,551 B2 * | 7/2005 | Barna et al. | 250/214 R |
| 8,134,623 B2 * | 3/2012 | Purcell et al. | 348/301 |
| 2002/0118289 A1 * | 8/2002 | Choi | 348/308 |
| 2002/0190193 A1 * | 12/2002 | Mizuno et al. | 250/214 R |
| 2004/0046685 A1 * | 3/2004 | Yun et al. | 341/169 |
| 2005/0092895 A1 | 5/2005 | Fossum | |
| 2005/0206752 A1 * | 9/2005 | Lim | 348/241 |
| 2006/0001750 A1 * | 1/2006 | Mizuguchi et al. | 348/294 |
| 2007/0008206 A1 * | 1/2007 | Tooyama et al. | 341/155 |
| 2008/0055432 A1 * | 3/2008 | Koseki | 348/241 |
| 2008/0192126 A1 * | 8/2008 | Purcell et al. | 348/222.1 |
| 2008/0284885 A1 * | 11/2008 | Taura | 348/300 |
| 2009/0231479 A1 * | 9/2009 | Zarnowski et al. | 348/302 |
| 2010/0110231 A1 * | 5/2010 | Funabashi | 348/234 |
| 2010/0157035 A1 | 6/2010 | Purcell et al. | |
| 2011/0141324 A1 * | 6/2011 | Koseki | 348/241 |
| 2011/0199519 A1 * | 8/2011 | Yamauchi | 348/244 |

FOREIGN PATENT DOCUMENTS

| | | |
|---|---|---|
| EP | 1874040 A2 | 1/2008 |
| WO | WO-2007135161 A1 | 11/2007 |

* cited by examiner

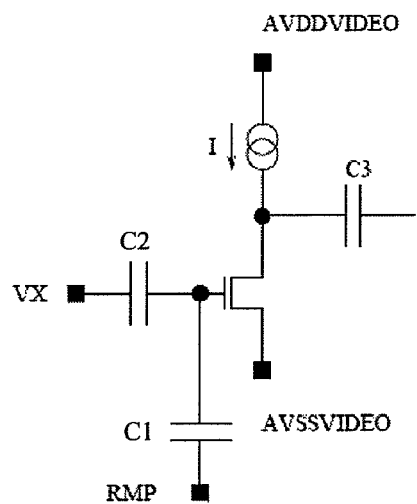  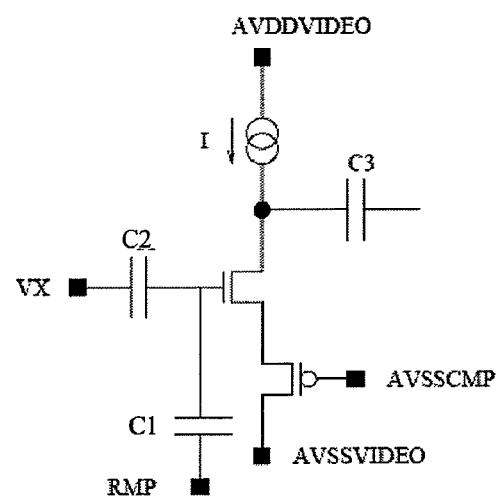
*Fig. 5a*  *Fig. 5b*

US 8,305,474 B2

ANALOG-TO-DIGITAL CONVERSION IN IMAGE SENSORS

PRIORITY CLAIM

The present application is a continuation-in-part from U.S. application for patent Ser. No. 12/402,397 filed Mar. 11, 2009, which claims the benefit of European Application for Patent No. 08153179.0 filed Mar. 21, 2008 entitled "Analog-to-Digital Converter in Image Sensors", the disclosures of which are hereby incorporated by reference to the maximum extent allowable by law.

BACKGROUND

1. Technical Field of the Invention

The present invention relates to analog-to-digital conversion (ADC) in an image sensor.

2. Description of Related Art

In common forms of image sensors, a two-dimensional array of pixels is read out row by row, the pixels of each column sharing column readout circuitry which commonly comprises correlated double sampling and ADC.

SUMMARY

In an embodiment, an image sensor has a pixel array and comprises: an input circuit comprising a first input for receiving an analog signal from a pixel of the pixel array, the signal varying during a pixel readout period and having a first level during a first reset period and a second level during a second read period, a second input for receiving a time variant reference signal, and two coupling capacitors; and a comparator circuit that compares the time variant reference signal and the analog signal; wherein the analog signal from the pixel and the time variant reference signal are constantly read onto one of the two coupling capacitors respectively of the input circuit during both the first reset period and the second read period; and wherein the comparator circuit includes a differential input for said combination of the analog pixel signal and the time variant reference signal, said differential input being biased by a fixed reference signal.

The use of a differential input as first stage of the comparator circuit reduces the effect of ground bounce and hence reduces x-droop. The differential input may comprise a differential amplifier or a differential front end circuit comprising first and second transistor devices, wherein the control electrode of the first transistor device provides said input receiving the combination of the analog pixel signal and the time variant reference signal, and the control electrode of the second transistor device provides said second input receiving a fixed reference signal, said devices being connected in series between a current source and ground.

The differential amplifier is typically a long tail pair.

Preferably the output of the differential amplifier is connected to an inverter via a further capacitor.

The fixed reference signal is preferably provided by sampling and holding a reference voltage, said sampling being performed during autozeroing of the pixel and comparator. This eliminates the effect of any noise present in the reference voltage.

The image sensor is particularly suitable to be incorporated in a mobile device; for example a mobile phone having a camera, a personal digital assistant having a camera, a digital camera, an optical pointing device, (such as an optical mouse), an endoscope apparatus, or an ambient light sensor.

In another embodiment, a method is provided for converting an analog signal from an image sensor pixel, during a pixel readout period to a digital signal using an analog to digital converter circuit. The analog to digital converter comprises an input circuit having first and second coupling capacitors, a time varying reference circuit enabled to provide a time varying reference signal, the first coupling capacitor being continuously connected to the time varying reference circuit and the second coupling capacitor being continuously connected to the pixel during the pixel readout period. The method comprises: (i) resetting the pixel, thereby sampling an analog signal equivalent to a pixel reset voltage onto the second capacitor; (ii) removing the pixel from reset, wherein the analog signal is corrected for pixel reset noise on the second capacitor; (iii) integrating light received on the pixel, wherein the analog signal is reduced according to the amount of light received; (iv) providing the time varying reference signal; (v) comparing the analog signal with the time varying reference signal; and (vi) outputting an output signal when the time variant reference signal corresponds to the analog signal. Further; said comparing is effected by applying the combination of the analog pixel signal and the time variant reference signal to an input of a differential amplifier, or other differential front end circuit, and biasing the differential amplifier with a fixed reference signal.

BRIEF DESCRIPTION OF THE DRAWINGS

Other features and advantages will become clear in the description which follows of several non-limiting examples, with reference to the attached drawings wherein:

FIGS. 5a and 5b show respectively a circuit diagram of a non-differential front-end and an alternative front end embodiment for the circuit of FIG. 2.

DETAILED DESCRIPTION OF THE DRAWINGS

Figure 1:
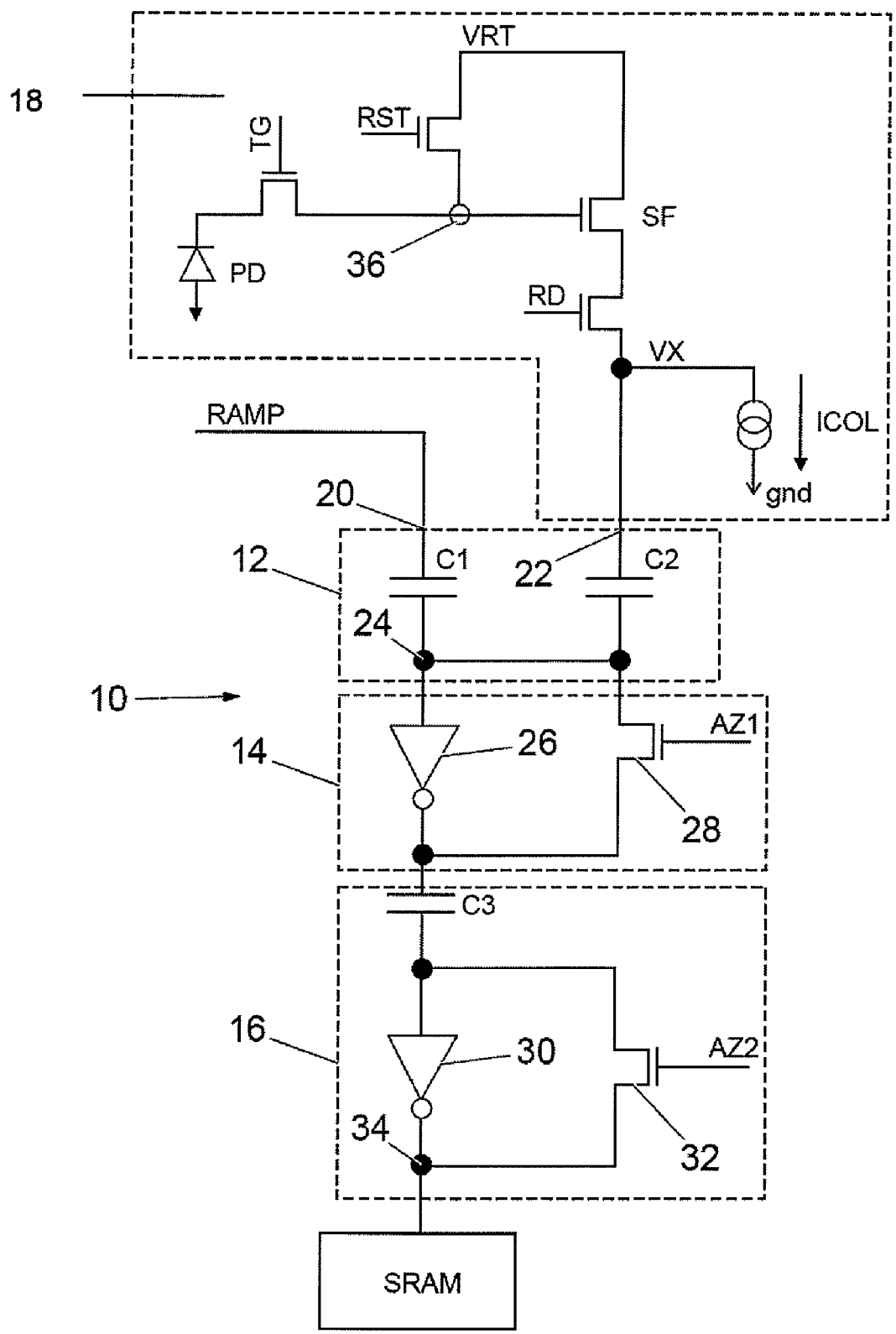
FIG. 1 is a schematic diagram of an embodiment of an ADC circuit as also described patent application EP1956715A.

European Patent Application EP1956715A discloses an ADC arrangement for an image sensor, one embodiment of which is shown in FIG. 1 of the present application. The structure and operation of this arrangement will be briefly described with reference to FIG. 1.

An analog to digital converter ADC 10 comprises an input circuit 12 and a comparator, the comparator comprising an inverter circuit 14 and an output circuit 16. The input 22 to the input circuit 12 is from the column output line of a pixel array, one pixel being shown at 18 by way of example.

The input circuit 12 comprises, in this example, a first capacitor C1 connected to a first input 20 and a second capacitor C2 connected to a second input 22. The first input 20 is connected to a ramp generator RAMP, which generates an appropriate time varying reference signal when required by the control means. The value of the time varying reference signal being known by the control means at any given time. The second input 22 is connected to the output of the pixel 18. The first and second capacitors C1, C2 are also connected to the input circuit's output node 24. The input circuit 12 allows correlated double sampling by zeroing the black pixel value.

The inverter circuit 14, which could be a CMOS, NMOS or PMOS type inverter, comprises a first inverter 26 and, on a feedback loop from the output of the first inverter 26, a first transistor 28. The first transistor 28, in this instance, operates as a switch and is activated by an autozero signal AZ1 from the control means.

The output circuit 16 comprises a third capacitor C3, connected to the output of the inverter circuit 14, a second inverter 30 and, on a feedback loop from the output of the second inverter 30, a second transistor 32. The second transistor 32, in this instance, operates as a switch and is activated by an autozero signal AZ2 from the control means. The output circuit 16 stores the value of the pixel 18 in a memory SRAM.

The pixel 18 comprises a photodiode PD, a transfer gate transistor TG, a reset transistor RST, a source follower transistor SF and a read transistor RD. The operation of the pixel transistors are controlled by the control means.

The comparator (inverter circuit 14 and an output circuit 16) can be described as a summing comparator, in that it adds the two input values RAMP and VX. If RAMP+VX is greater than zero, the output of the comparator goes high, and, if RAMP+VX is less than zero, the output of the comparator goes low, where zero for RAMP is the value of RAMP when VX(black) is measured and zero for VX is VX(black).

The arrangement of FIG. 1 was devised to mitigate sample and hold noise caused by sample and hold capacitors of a correlated double sample circuit, more commonly known as kT/C noise, and means that to reduce noise by two, capacitor size requires to go up by four. As such, size or noise limits are placed on the design of the image sensor. In the arrangement of FIG. 1, the kT/C noise of the sample capacitors, C1 and C2, is mitigated by removing the requirement to hold. That is, the capacitors C1 and C2 are continuously connected to the ramp generator and VX respectively and, as such, there is a less kT/C noise generated than if a hold operation was performed. This allows C1 and C2 to be reduced in size.

In operation, during a read out cycle of a pixel, the control means firstly turns on read transistor RD, to indicate that this pixel should be read out. Reset transistor RST is then turned on in a reset phase for a period up to a first timing point.

At the first timing point, the control means then applies signal AZ1 to transistor 28 and AZ2 to transistor 32, as well as turning off reset transistor RST. In taking the pixel 18 out of reset, the output node VX drops in voltage according to the kT/C noise and charge injection of the reset transistor RST (the pixel reset noise). This gives a value for VX(black), the value of the pixel 18 if no light is detected taking into account pixel reset noise. As transistor 28 and transistor 32 have been turned on, the switching point of the inverter circuit 14 is sampled onto capacitors C1 and C2 and the switching point of the output circuit 16 is sampled onto capacitor C3. In addition, capacitor C2 will also have sampled VX(black) on the opposite side to the switching point of the inverter circuit 14. Also at this point, the RAMP voltage is set to a value higher than zero in order to remove RAMP non-linearity's when it starts to ramp the voltage.

At the next timing point the control means turns off transistor 28 by removing the signal AZ1. As a result, the kT/C noise and charge injection from the inverter circuit 14 is sampled onto capacitors C1 and C2, as represented by the small drop in voltage at node 24. As AZ2 is still on, this kT/C noise is sampled onto capacitor C3 of the output circuit. That is, the switching point of the output circuit 16 is sampled on one side of capacitor C3 and the kT/C noise of the inverter circuit 14 on the other side.

At the next timing point the control means turns off transistor 32 by removing signal AZ2. As a result, the kT/C noise from the output circuit and charge injection of transistor 32 is sampled onto capacitor C3, as represented by a small drop in voltage at the input to second inverter 30.

At the next timing point the transfer gate transistor TG is turned on by the control means starting a sensing phase and allowing the impinging light on the photodiode to effect the voltage at the sense node 36 and, as a result, causing a decrease in voltage at VX. The transfer gate transistor TG is then turned off again by the control means. The change in voltage during this period is related to the amount of light which has been received by the pixel 18. The drop in voltage at VX is reflected proportionally at node 24 and is equivalent to VX(signal), which is the value of the pixel 18 after integration.

At the next timing point the ramp generator RAMP is started by the control means. The ramp generator voltage is reduced to begin with so that, if there is only a small change in VX, it can still be detected. The ramp generator RAMP then increases the ramp voltage over the range of detectable voltage levels. When the ramp voltage increases beyond the voltage at VX, the voltage at node 34 goes high. The digital word representing that point is then stored in the memory SRAM by the control means, as the high at node 34 indicates that the level of RAMP corresponds to VX(black)-VX(signal) and the level of RAMP is known by the control means.

Once the ramp generator RAMP has reached the highest voltage, the ramp generator RAMP is reset to its nominal voltage. The control means then resets the pixel by turning the reset transistor RST on and the process can then be repeated, as required.

Although this arrangement provides advantages over the prior art, it has been found to have some deficiencies when applied to large arrays and/or high speeds. This arises particularly where the scene being imaged is "flat", that is one with little contrast. In this situation, a large number of inverters fire at the same time; this causes a lot of current to pass through the ground plane which in turn causes the ground plane voltage to rise (a phenomenon known as "ground bounce"). The rise in ground plane voltage affects column capacitors differently across the x-direction of the array (in particular the first inverter is very sensitive to ground bounce), causing an effect in the resulting image sometimes referred to as "x-droop". This can be counteracted by using wide power tracks, but such an approach is not area efficient in larger arrays.

A need exists to provide an ADC arrangement which overcomes this problem while retaining the advantages of the prior arrangement in relation to a combination of simplicity, good performance, and efficient use of area.

Figure 2:
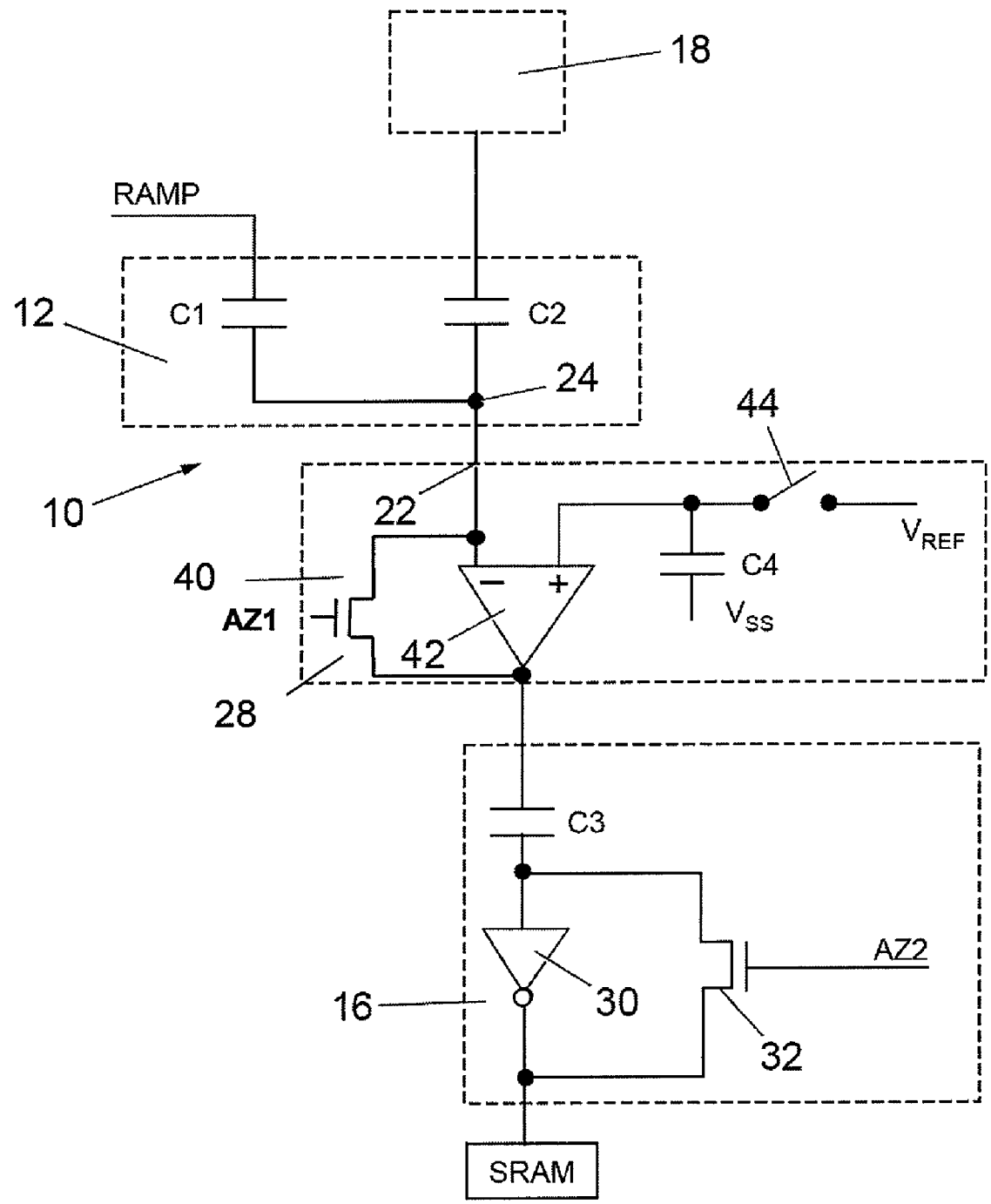
FIG. 2 is a schematic of an embodiment of an ADC circuit.

Referring now to FIG. 2 (in which the pixel 18 has been omitted for simplicity), the inverter circuit 14 is replaced by a circuit 40 which comprises a differential amplifier 42, which will typically be a long tail pair, receiving the output of capacitors C1 and C2 at one input terminal. The differential amplifier is autobiased at the other input terminal by a reference voltage Vref. In order to eliminate line noise artifacts, which would be introduced by a noisy reference voltage, the reference voltage is sampled and learned during autozeroing of the pixel and comparator; this is accomplished by a switch 44 (which will typically be a transistor) closing to sample Vref onto a capacitor C4.

The use of a differential amplifier as the first stage makes the output circuit more resistant to ground bounce, leading to a reduction in x-droop. This is because the input is now compared to a fixed reference signal and not ground.

The circuitry of FIG. 2 (and of FIG. 1) is sensitive to image artifacts of a type known as smear. Smearing is essentially caused by the differential amplifier's Miller capacitance. This is an inherent capacitance between the input and the output of the output side transistor of the long tail pair, of which the differential amplifier is comprised. The Miller effect results in variation in the load capacitance leading to a change in the ramp delay, as the ramp signal effectively becomes load, and therefore image, dependent. Connectivity of the differential input stage allows the ramp signal to see a constant capacitive load, thus reducing smear.

Figure 3:
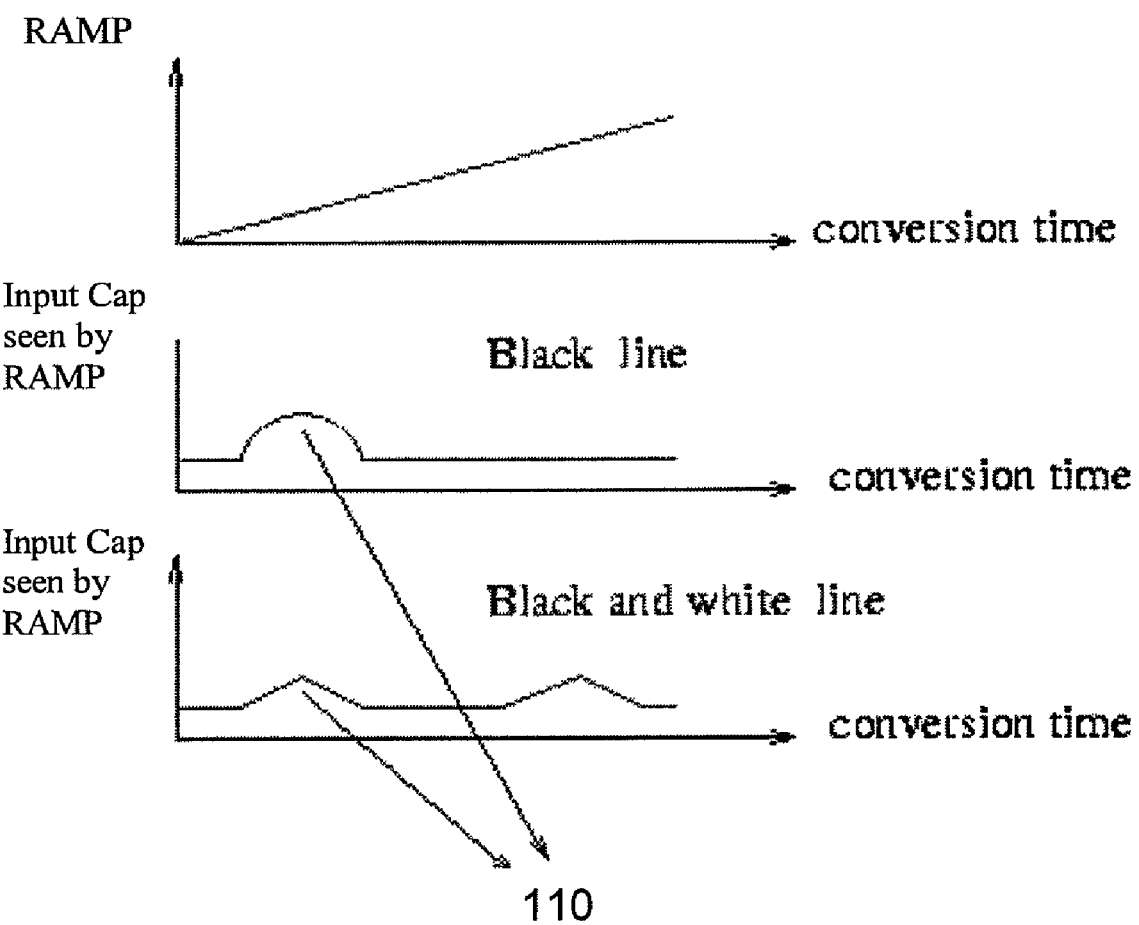
FIG. 3 illustrates graphically the problem of smearing.

FIG. 3 illustrates the issue. The top graph shows the reference ramp signal. The middle graph shows the signal trace on input capacitor C1 for a black line. The bottom graph shows the signal trace on input capacitor C1 for a black and white line. As can be seen at points 110, the ramp for the black line is delayed more than the ramp for the black and white line. This means that the "black" in the black line appears greyer (less black) than the "black" for the black and white line.

Figure 4:
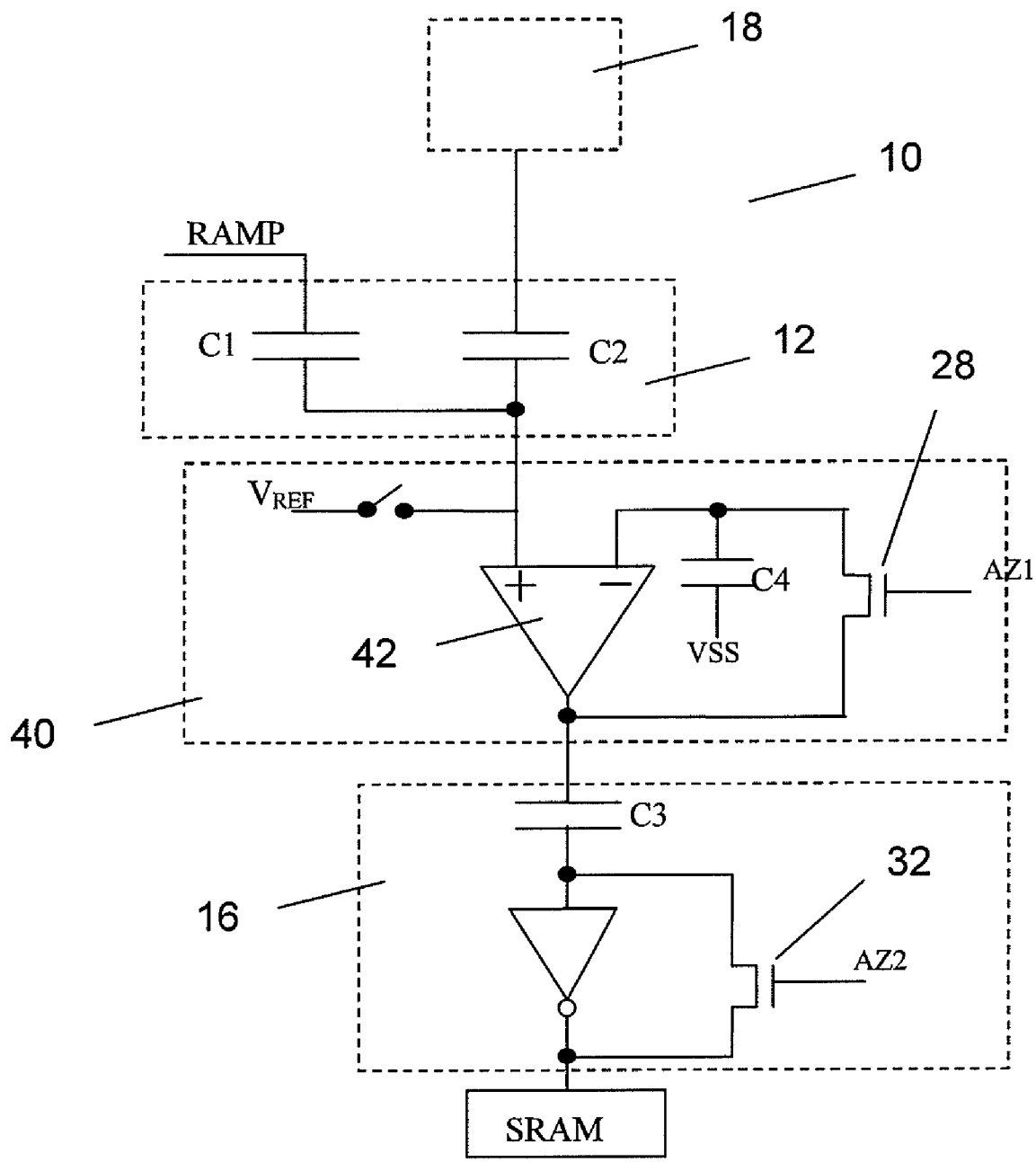
FIG. 4 is a circuit diagram of an alternative embodiment to the circuit of FIG. 2.

FIG. 4 shows a variation on the front end circuit of FIG. 2, to address this smearing effect. The design of the front end is altered as shown, and in particular the input capacitors C1 and C2 have changed input (as has capacitor C4). Consequently, the capacitance seen by the ramp is no longer affected by the Miller capacitance between the inverting input and output. Therefore whichever state the column comparator front end is in, the capacitance seen by the DAC is the same. This leads to the removal of the smearing effect.

The situation when black level signal VX(black) is being output from the pixel 18 is as follows. $V_{REF}$ has pre-charged the non-inverting input of differential amplifier, such that when signal AZ1 is high and switch 28 is closed, the input offset of differential amplifier 42 is stored on capacitor C4. When signal AZ1 goes low and switch 28 opens, there will be charge injection and kT/C noise sampled on capacitor C4. This will cause the output of the differential amplifier to rise slightly. This rise is stored across capacitor C3. Signal AZ2 then goes low and switch 32 opened and the circuit 16 operates as described in relation to FIG. 1.

The differential front ends of FIGS. 2 and 4 are designed for large arrays (for example 5 megapixel devices requiring arrays in the region of 2700 comparators). However this results in a larger column, while it is often desirable to keep column size down, in particular with small resolutions with which smearing is not such an issue.

Consequently, for products with a lower resolution where column height is an important factor, a full differential input may not be appropriate. However, ground bounce still remains an issue, and therefore it would still be advantageous for the input not to be referenced to this unstable ground reference.

FIG. 5b shows a modified front-end circuit which addresses this issue (FIG. 5a is the front end of FIG. 1, in component form, for comparison). The front end is now a pseudo-differential inverter, where one input is connected to the input capacitors C1 and C2 and the other to a ground plane carrying no current (AVSSCMP). This means the comparator becomes more resistant to the ground plane carrying the current (AVSSVIDEO), as the input is now referenced to a more stable reference. This leads to an improved rejection to ground, hence less x-droop.

The circuitry of FIGS. 2. 4 and 5b can be implemented within any of the following types of devices: a mobile phone; a personal digital assistant; a digital camera; an optical pointing device such as an optical mouse; an endoscope apparatus; and an ambient light sensor.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
   an input circuit comprising a first input adapted to receive an analog signal from a pixel of a pixel array, the signal varying during a pixel readout period and having a first level during a first reset period and a second level during a second read period, a second input adapted to receive a time variant reference signal, and two coupling capacitors; and
   a comparator circuit adapted to compare the time variant reference signal and the analog signal;
   wherein the analog signal from the pixel and the time variant reference signal are constantly read onto one of the two coupling capacitors respectively of the input circuit during both the first reset period and the second read period; and
   wherein the comparator circuit comprises a differential input adapted to combine the analog signal and the time variant reference signal, said differential input being biased by a fixed reference signal.

2. The circuit according to claim 1, in which the differential input is provided by a differential amplifier.

3. The circuit according to claim 2, in which the differential amplifier is a long tail pair.

4. The circuit according to claim 3 wherein the long tail pair comprises two main transistors, wherein a first of said main transistors is configured to receive the combination of the analog signal and the time variant reference signal and the fixed reference signal and wherein the output of the long tail pair is arranged to be taken from a second of said main transistors.

5. The circuit according to claim 2, in which an output of the differential amplifier is connected to an inverter via a further capacitor.

6. The circuit according to claim 1, further comprising a sample and hold circuit adapted to provide the fixed reference signal by sampling and holding a reference voltage, said sampling being performed during autozeroing of the pixel and comparator circuit.

7. The circuit according to claim 1 wherein the combination of the analog signal and the time variant reference signal is received at a first input of said differential input and the fixed reference signal is received at a second input of said differential input.

8. The circuit according to claim 1 wherein the combination of the analog signal and the time variant reference signal along with the fixed reference signal are received at a single input of said differential input.

9. The circuit according to claim 8 wherein said single input is a non-inverting input.

10. The circuit according to claim 1 wherein said differential input is comprised in a differential front end circuit comprising first and second transistor devices, and wherein the control electrode of the first transistor device provides said first input receiving the combination of the analog signal and the time variant reference signal, and the control electrode of the second transistor device provides said second input receiving a fixed reference signal, said devices being connected in series between a current source and ground.

11. The circuit according to claim 10 wherein said fixed reference signal is obtained by connecting said second input to a ground plane carrying no current, different from a main ground plane of the circuit.

12. The circuit according to claim 10 wherein the first transistor device comprises a NMOS transistor and the second transistor device comprises a PMOS transistor, the output of the differential front end circuit being taken from the first transistor's drain electrode.

13. The circuit according to claim 1 wherein the comparator circuit operates to add the time variant reference signal and the analog signal and compare the sum with a threshold value.

14. The circuit according to claim 1 wherein the comparator circuit comprises a differential amplifier circuit and an output circuit, the output circuit comprising an output capacitor.

15. The circuit according to claim 14, wherein the differential amplifier circuit has a first selectively connectable feedback loop and the output circuit further comprises an output inverter and a second selectively connectable feedback loop such that the selective connection of the first and second feedback loops allows for the sampling of offset voltages resultant from thermal noise from the pixel, differential amplifier circuit and output circuit such that the analog signal can be appropriately corrected.

16. The circuit according to claim 15, wherein said selective connection of the first and second feedback loops results in an input offset of said output circuit being sampled onto a first plate of the output capacitor and thermal noise from the differential output circuit being sampled onto a second plate of said output capacitor.

17. An circuit according to claim 15, wherein said selective connection of the second feedback loop results in thermal noise from the output circuit being sampled onto the output capacitor.

18. A device comprising:
an image sensor array including pixel element;
an input circuit comprising a first input adapted to receive an analog signal from the pixel element, the signal varying during a pixel readout period and having a first level during a first reset period and a second level during a second read period, a second input adapted to receive a time variant reference signal, and two coupling capacitors; and
a comparator circuit adapted to compare the time variant reference signal and the analog signal;
wherein the analog signal from the pixel and the time variant reference signal are constantly read onto one of the two coupling capacitors respectively of the input circuit during both the first reset period and the second read period;
and wherein the comparator circuit comprises a differential input adapted to combine the analog signal and the time variant reference signal, said differential input being biased by a fixed reference signal.

19. The device as claimed in claim 18, wherein the device is a mobile phone having a camera including the image sensor array.

20. The device as claimed in claim 18, wherein the device is a personal digital assistant having a camera including the image sensor array.

21. The device as claimed in claim 18, wherein the device is a digital camera.

22. The device as claimed in claim 18, wherein the device is an optical pointing device such as an optical mouse.

23. The device as claimed in claim 18, wherein the device is an endoscope apparatus including the image sensor array.

24. The device as claimed in claim 18, wherein the device is an ambient light sensor.

25. A method of converting an analog signal from an image sensor pixel, during a pixel readout period to a digital signal using an analog to digital converter circuit comprising an input circuit having first and second coupling capacitors, a time varying reference circuit enabled to provide a time varying reference signal, the first coupling capacitor being continuously connected to the time varying reference circuit and the second coupling capacitor being continuously connected to the pixel during the pixel readout period, the method comprising:
(i) resetting the pixel;
(ii) removing the pixel from reset, wherein the analog signal contains the pixel reset noise on the second capacitor;
(iii) integrating light received on the pixel, wherein the analog signal is reduced according to the amount of light received;
(iv) providing the time varying reference signal;
(v) comparing the analog signal with the time varying reference signal; and
(vi) outputting an output signal when the time variant reference signal corresponds to the analog signal;
wherein: said comparing is effectuated by applying the combination of the analog signal and the time variant reference signal to a differential front end circuit, said differential front end circuit being biased by a fixed reference signal.

26. The method according to claim 25, wherein applying the fixed reference signal comprises sampling and holding a reference voltage.

27. The method according to claim 26, wherein said sampling is performed during autozeroing of the pixel array.

28. The method according to claim 25, in which the differential front end circuit comprises a differential amplifier.

29. The method according to claim 25 wherein the combination of the analog signal and the time variant reference signal and the fixed reference signal is fed to a single input of said differential input.

30. The method according to claim 25 wherein said differential front end circuit comprises first and second transistor devices and wherein the combination of the analog signal and the time variant reference signal is fed to the control electrode of the first transistor device, and the fixed reference signal is fed to the control electrode of the second transistor device, said devices being connected in series between a current source and ground.

31. The method according to claim 30 wherein said fixed reference signal is obtained by connecting said second input to a ground plane carrying no current, different from the circuit's main ground plane.

32. The method according to claim 30 wherein the first transistor device comprises a NMOS transistor and the second transistor device comprises a PMOS transistor, the output of the differential front end circuit being taken from the first transistor's drain electrode.

33. The method according to claim 25 wherein the comparing step comprises adding the time variant reference signal and the analog signal and comparing the sum with a threshold value.

34. The method according to claim 25, wherein, if step (v) causes one or more associated offset voltages, the method further comprises sampling said one or more associated offset voltages such that the analog signal is appropriately corrected.

35. A circuit, comprising:
a pixel element adapted to output a voltage signal;
a first capacitor connected to receive only the voltage signal;
a second capacitor connected to receive only a ramping reference voltage signal; and
a differential comparator adapted to receive a summed output from the first and second capacitors,
said differential comparator biased by a fixed reference voltage.

36. The circuit of claim 35 further comprising a sample and hold circuit adapted to generate the fixed reference voltage.

37. The circuit of claim 35 further comprising:
a third capacitor connected to receive a signal output from the differential comparator;
an inverter circuit having an input connected to receive an output from the third capacitor; and
a feedback switching circuit connected between the input of the inverter circuit and an output of the inverter circuit.

38. The circuit of claim 35 further comprising a memory adapted to store a data signal value output from the inverter circuit.

* * * * *